(12) United States Patent
Xu et al.

(10) Patent No.: US 10,232,588 B2
(45) Date of Patent: Mar. 19, 2019

(54) SILOXANE COMPOSITIONS AND METHODS FOR REDUCING VOC AND SILOXANE DUST

(71) Applicant: UNITED STATES GYPSUM COMPANY, Chicago, IL (US)

(72) Inventors: Yufeng Xu, Gurnee, IL (US); Wenqi Luan, Hawthorn Woods, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 457 days.

(21) Appl. No.: 14/523,016

(22) Filed: Oct. 24, 2014

(65) Prior Publication Data

US 2015/0306846 A1 Oct. 29, 2015

Related U.S. Application Data

(60) Provisional application No. 61/984,206, filed on Apr. 25, 2014.

(51) Int. Cl.
| | | |
|---|---|---|
| B32B 13/08 | (2006.01) | |
| B32B 13/00 | (2006.01) | |
| B32B 29/00 | (2006.01) | |
| C04B 24/42 | (2006.01) | |
| C04B 28/14 | (2006.01) | |
| B28B 19/00 | (2006.01) | |

(Continued)

(52) U.S. Cl.
CPC ............ *B32B 13/08* (2013.01); *B32B 13/00* (2013.01); *B32B 29/002* (2013.01); *C04B 24/42* (2013.01); *C04B 28/14* (2013.01); *B28B 5/021* (2013.01); *B28B 19/0092* (2013.01); *B32B 2250/03* (2013.01); *B32B 2250/40* (2013.01); *B32B 2307/3065* (2013.01); *B32B 2307/7265* (2013.01); *B32B 2307/73* (2013.01); *B32B 2419/00* (2013.01); *C04B 2111/0062* (2013.01); *C04B 2111/00629* (2013.01); *C04B 2201/10* (2013.01)

(58) Field of Classification Search
None
See application file for complete search history.

(56) References Cited

U.S. PATENT DOCUMENTS

| | | |
|---|---|---|
| 2,198,776 A | 4/1940 | King et al. |
| 3,623,895 A | 11/1971 | Nitzsche et al. |

(Continued)

FOREIGN PATENT DOCUMENTS

| | | | |
|---|---|---|---|
| CA | 2207821 A1 | 11/1997 | |
| EP | 1283196 A1 * | 2/2003 | ............ C03C 13/00 |

(Continued)

OTHER PUBLICATIONS

CAS Registry No. 42557-10-8, pp. 1-2 Scifinder, American Chemical Society, (2017).*

(Continued)

*Primary Examiner* — Kenneth J Stachel
(74) *Attorney, Agent, or Firm* — Greer, Burns & Crain, Ltd.; Pradip Sahu; Philip T. Petti

(57) ABSTRACT

An improved water-resistant gypsum product prepared with a high-viscosity siloxane is provided. A fuel-efficient method for making the product and reducing the amount of siloxane dust released is provided as well.

9 Claims, 2 Drawing Sheets

(51) Int. Cl.
  *C04B 111/00* (2006.01)
  *B28B 5/02* (2006.01)

(56) References Cited

U.S. PATENT DOCUMENTS

| | | | |
|---|---|---|---|
| 3,914,476 A * | 10/1975 | Nitzsche | C04B 41/501 |
| | | | 106/287.12 |
| 4,371,399 A | 2/1983 | May et al. | |
| 4,411,701 A | 10/1983 | Saito et al. | |
| 4,411,702 A | 10/1983 | Makino et al. | |
| 4,643,771 A | 2/1987 | Steinbach et al. | |
| 5,817,262 A | 10/1998 | Englert | |
| 5,847,037 A | 12/1998 | Mazanek et al. | |
| 7,294,195 B2 | 11/2007 | Kirkpatrick | |
| 7,413,603 B2 | 8/2008 | Miller et al. | |
| 7,803,226 B2 | 9/2010 | Wang et al. | |
| 7,892,472 B2 | 2/2011 | Veeramasuneni et al. | |
| 2006/0035112 A1 * | 2/2006 | Veeramasuneni | C04B 14/304 |
| | | | 428/703 |
| 2012/0015108 A1 | 1/2012 | Sarrazin et al. | |
| 2012/0309875 A1 | 12/2012 | Aberle et al. | |

FOREIGN PATENT DOCUMENTS

| | | |
|---|---|---|
| EP | 1 112 986 A1 | 7/2011 |
| FR | 2776654 | 10/1999 |
| GB | 2062607 A | 5/1981 |
| JP | H02160651 A | 6/1990 |
| JP | H11274705 A | 10/1999 |
| WO | WO 2006020369 | 2/2006 |
| WO | WO 2013020173 | 2/2013 |

OTHER PUBLICATIONS

English machine translation of JP 02-160651 (1990).*
PCT International Search Report.
SiSiB(R) PSI10740 Water Repellent, 2008 Power Chemical Corporation Ltd., [retrieved from Internet on Feb. 20, 2018] <URL: http://www.powerchemical.net/library/public/SiSib_PSI10740.pdf>, published on Sep. 6, 2012 as per Google.
Japanese Office Action dated Oct. 15, 2018 for Japanese Patent Application No. 2016-563794.

* cited by examiner

SILOXANE COMPOSITIONS AND METHODS FOR REDUCING VOC AND SILOXANE DUST

RELATED PATENT APPLICATIONS

This patent application claims its priority to U.S. Provisional Patent Application 61/984,206, the entire disclosure of which is incorporated herein by reference in its entirety.

This patent application relates to U.S. Provisional Patent Application 61/977,885, the disclosure of which is incorporated herein by reference in its entirety.

FIELD OF THE INVENTION

The invention relates to gypsum products with improved water resistance and prepared with at least one high-viscosity siloxane. It also relates to fuel-efficient methods of manufacturing the products in which the levels of siloxane dust and volatile organic compounds (VOC) during manufacturing are reduced.

BACKGROUND

Fire-retardant gypsum panels and other products of many useful shapes can be produced by dehydrating and rehydrating gypsum, also known as calcium sulfate dihydrate or landplaster. Such gypsum products are commonly used in building construction. Typical gypsum products include a dry wall and gypsum-fiber board. A dry wall comprises a gypsum core sandwiched between cover sheets such as paper or polymeric mats. A gypsum-fiber board comprises a gypsum core in which fibers are incorporated, but no cover sheets are used, although the gypsum core in a gypsum-fiber board may be coated with various coatings.

As gypsum by itself is not water-resistant, there has been a considerable amount of work on improving water resistance of gypsum products. Hydrocarbons, including wax and asphalt are suggested to reduce water uptake in U.S. Pat. No. 2,198,776. Materials including metallic soaps and silicones have been used as coatings on the surface of a finished gypsum product. However, it is difficult to obtain a coating made of these materials with consistent water resistance.

U.S. Pat. No. 4,411,701 discloses adding alkaline metal alkylsiliconates or phenylsiliconates together with calcium hydroxide or calcium oxide to gypsum in making waterproof gypsum molded products, while U.S. Pat. No. 4,371,399 discloses a water-repellent gypsum mortar comprising certain fatty amines. U.S. Pat. No. 7,294,195 discloses water repellant gypsum compositions comprising a hydroxyl-based cellulose and a siliconate.

Siloxane emulsions can be added to a gypsum slurry and these emulsions are useful for improving water-resistance of a gypsum product. A siloxane emulsion was added to gypsum-fiber boards in U.S. Pat. No. 5,817,262 to Englert. In addition to siloxane emulsions, siloxane dispersions can also be used for improving water-resistance of a gypsum product, as described in U.S. Pat. No. 7,413,603 to Miller.

Adding siloxane to a gypsum slurry improves significantly water resistance of a resulting gypsum product. For example, the use of polymethylhydrogen siloxane for producing a water-resistant gypsum product is provided by EP 1 112 986 A1.

During manufacturing, a gypsum product is subjected to a drying process and is exposed to high temperatures. During the drying process in an oven (kiln), siloxane evaporates out of the gypsum product and is carried to burners. Decomposed pieces of siloxane are burned and form very fine powdery siloxane dust. This dust reduces drying efficiency of the kiln and results in increased wear and tear of equipment including burners and fans.

SUMMARY

It is an objective of the present invention to provide a gypsum product having improved water resistance and reduced siloxane evaporation during drying. One embodiment provides a gypsum product comprising a gypsum core formulated with a high-viscosity siloxane. Suitable high-viscosity siloxanes include those with viscosity of at least 30 cps. Suitable high-viscosity siloxanes also include those with viscosity of at least 40 cps. In some embodiments, a high-viscosity siloxane has viscosity of at least 60 cps.

In some products, a high-viscosity siloxane is used in a concentration from 0.08% to 1%. Various gypsum products are contemplated, including wall boards and gypsum-fiber boards. Various high-viscosity siloxanes are suitable, including methylhydrogen siloxane.

Further embodiments provide methods for making gypsum products with improved water resistance and decreased emission of total hydrocarbon during manufacturing. The methods include a step of formulating a gypsum slurry comprising at least one high-viscosity siloxane and forming various gypsum products from the slurry. Such gypsum products may include panels, boards, tiles and ceiling tiles. A gypsum product includes a gypsum-fiber board with a high viscosity siloxane, where at least one surface of the gypsum core is coated with a chemical coating such as potassium methyl siliconate.

Further embodiments include a method of manufacturing a gypsum product, the method comprising: preparing a gypsum slurry comprising a high-viscosity siloxane of 30 cps to 242 cps by mixing at least stucco, water, the high-viscosity siloxane, and at least one accelerator of siloxane polymerization; forming the gypsum slurry into a gypsum core of a gypsum product; allowing the gypsum slurry to set; and drying the gypsum product in a kiln; wherein the level of siloxane dust generated in the kiln during manufacturing the gypsum product is decreased by at least 10% in comparison to a gypsum product made with a low-viscosity siloxane of about 20 cps.

Further embodiments include a method of manufacturing a gypsum product, the method comprising: preparing a gypsum slurry comprising a high-viscosity siloxane of 30 cps to 242 cps by mixing at least stucco, water, the high-viscosity siloxane, and at least one accelerator of siloxane polymerization; forming the gypsum slurry into a gypsum core of a gypsum product; allowing the gypsum slurry to set; and drying the gypsum product in a kiln; wherein the level of siloxane dust generated in the kiln during manufacturing the gypsum product is decreased by at least 30% in comparison to a gypsum product made with a low-viscosity siloxane of about 20 cps.

DETAILED DESCRIPTION

Figure 1:
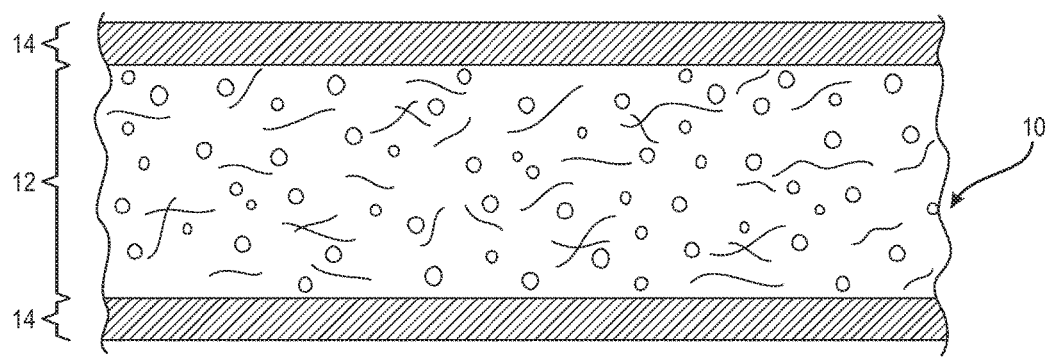
FIG. 1 is a cross-section through a gypsum product which includes cover sheets.

The present invention provides gypsum products prepared from a pumpable, flowable gypsum slurry comprising at least one high-viscosity siloxane. FIG. 1 is a cross-section of one embodiment in which a gypsum product (10) comprises a gypsum core (12) which is formed from a gypsum slurry comprising a high-viscosity siloxane and a cover sheet (14) selected from paper sheets and polymeric mats and applied to at least one side of the gypsum core (12). The gypsum core (12) may further comprise other additives, such as wood or paper fibers, organic and inorganic fillers, binders, defoamers, detergents, dispersants, coloring agents and anti-microbial agents.

Figure 2:
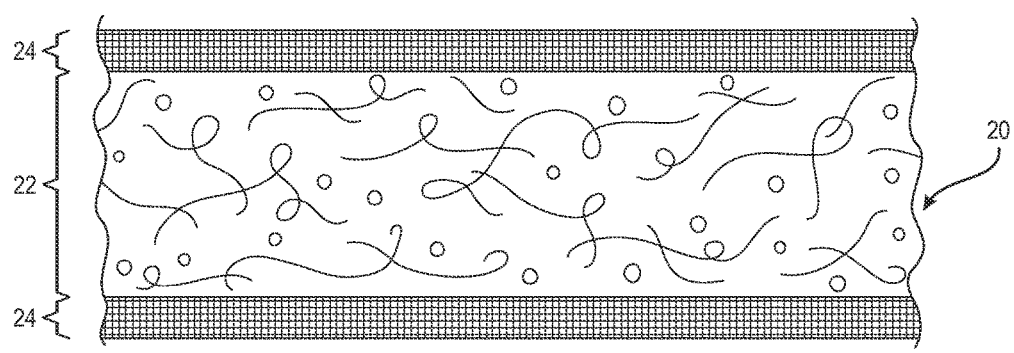
FIG. 2 is a cross section through a gypsum-fiber product which does not include cover sheets.

FIG. 2 is a cross-section of another embodiment in which a gypsum product (20) comprises a gypsum-fiber board (22) which is formed from a gypsum slurry comprising a high-viscosity siloxane. The gypsum fiber board (22) may be optionally covered with a chemical coating (24) which can be applied to at least one surface of the gypsum core. The gypsum-fiber board (22) may further comprise other additives, such as wood or paper fibers, organic and inorganic fillers, binders, defoamers, detergents, dispersants, coloring agents and anti-microbial agents.

Contemplated gypsum products include, but are not limited to, panels, boards, tiles, ceiling tiles and products of various custom-designed shapes. The term gypsum, as used herein, means calcium sulfate in the stable dihydrate state, i.e., $CaSO_4 \cdot 2H_2O$, and includes the naturally occurring mineral, the synthetically derived equivalents, and the dihydrate material formed by the hydration of calcium sulfate hemihydrate (stucco) or anhydrite. The term "calcium sulfate material", as used herein, means calcium sulfate in any of its forms, namely calcium sulfate anhydrite, calcium sulfate hemihydrate, calcium sulfate dihydrate and mixtures thereof.

Various siloxane compounds which are capable of forming a polymer/resin, also known as a polysiloxane with general formula $(R_2SiO)_n$, wherein n is a number of times the $R_2SiO$ unit is repeated in a polymer, R can be any organic group, including vinyl ($CH_2$), methyl ($CH_3$), and phenyl ($C_6H_5$), can be used for forming a polymeric matrix in a gypsum product. Suitable organosiloxanes may further include organohydrogensiloxanes which comprise Si-bonded hydrogen. Suitable organohydrogensiloxanes include methylhydrogensiloxane available under trade name from Wacker Chemical Corporation or Dow Corning Chemical.

The viscosity of siloxane currently used in the gypsum industry is usually at about 20 cps and it is even less for wall boards. These siloxanes are considered to be low-viscosity siloxanes. However and despite this well settled notion, the inventors have unexpectedly found that the use of a high-viscosity/molecular weight siloxane instead of the conventional formulation results in significant reduction in VOC.

The term "high viscosity siloxane" means a siloxane with viscosity of above 30 cps. The inventors have discovered that an increase of viscosity from 20 cps to above 30 cps can reduce the amount of total hydrocarbon released. Since the amount of siloxane dust generated is directly proportional to the amount of total hydrocarbon, the use of a high-viscosity siloxane results in significant reduction of siloxane dust. At least in some embodiments, high-viscosity siloxane is a high molecular weight hydrogen modified siloxane, such as polymethylhydrogen siloxane, with viscosity of at least 36 cps and adapted to be polymerized into silicone. At least in some embodiments, high-viscosity siloxane is a high molecular weight hydrogen modified siloxane, such as polymethylhydrogen siloxane, with viscosity of at least 40 cps and adapted to be polymerized into silicone. At least in some embodiments, high viscosity siloxane is a high molecular weight hydrogen modified siloxane, such as polymethylhydrogen siloxane, with viscosity of at least 50 cps and adapted to be polymerized into silicone. At least in some embodiments, high viscosity siloxane is a high molecular weight hydrogen modified siloxane, such as polymethylhydrogen siloxane, with viscosity in the range from 60 cps to 80 cps and adapted to be polymerized into silicone. At least in some embodiments, high-viscosity siloxane is a high molecular weight hydrogen modified siloxane, such as polymethylhydrogen siloxane, with viscosity of at least 80 cps and adapted to be polymerized into silicone. In some embodiments, high-viscosity siloxane is a siloxane with viscosity above 36 cps. In some embodiments, high-viscosity siloxane is a siloxane with viscosity above 40 cps. In some embodiments, high-viscosity siloxane is a siloxane with viscosity above 50 cps. In some embodiments, high-viscosity siloxane is a siloxane with viscosity from 60 to 80 cps.

A high-viscosity siloxane is preferably added in the form of an emulsion or dispersion to a gypsum slurry. Preferably, a high-viscosity siloxane dispersion is mixed with a gypsum slurry as described in U.S. Pat. No. 7,413,603, incorporated herein by reference. A final concentration for high-viscosity siloxane in a gypsum slurry can be ranging from about 0.08% to about 1%, from about 0.1% to about 0.8% or from about 0.4% to about 0.5%, based on the weight of the gypsum slurry.

Various accelerators can be added to initiate polymerization of siloxane in a gypsum product. Such accelerators include, but are not limited to, magnesium oxide. The siloxane polymerization accelerators can be used in various concentrations. In some embodiments, a siloxane polymerization accelerator is used in a concentration from 0.01% to 0.1%.

In some embodiments, gypsum products are prepared from a slurry which comprises from 80% to 95% of gypsum stucco. At least in some embodiments, cellulosic fibers can be added to the slurry in various concentrations. In some embodiments, fibers are used in the range from 5% to 10%. Suitable fibers include, but are not limited to, wood and paper fibers.

Various methods can be employed for preparing a gypsum product from a gypsum slurry comprising at least one high-viscosity siloxane. In some embodiments, a gypsum slurry, optionally comprising further wood or paper fibers, is processed in a pressure vessel at a temperature sufficient to convert the gypsum to calcium sulfate alpha hemihydrate. Following calcining, a high-viscosity siloxane dispersion and other additives are injected into the slurry.

While still hot, the slurry is pumped into a fourdrinier-style headbox that distributes the slurry along the width of the forming area. From the headbox, the slurry is deposited onto a continuous drainage fabric where the bulk of the water is removed and on which a filter cake is formed. As much as 90% of the uncombined water may be removed from the filter cake by the felting conveyor. Dewatering is preferably aided by a vacuum to remove additional water. As much water is preferably removed as practical before the hemihydrate cools and is converted to the dihydrate. The formation of the filter cake and its dewatering are described in U.S. Pat. No. 5,320,677, herein incorporated by reference. In other embodiments, gypsum slurry is sandwiched between two sheets of paper or two polymeric mats.

The slurry is compacted and formed into any desired shape. Any forming method can be used, including pressing, casting, molding and the like. As a consequence of the water removal, the filter cake is cooled to a temperature at which rehydration may begin. However, it may still be necessary to provide additional external cooling to bring the temperature low enough to effect the rehydration within an acceptable time. While the filter cake is still able to be shaped, it is preferably wet-pressed into a board, panel or any other gypsum product of the desired size, shape, density and thickness.

A test that measures the release of total hydrocarbon can be conducted on gypsum samples prepared with either low-viscosity siloxane or high-viscosity siloxane. There is a direct correlation between the amount of total hydrocarbon released and the amount of siloxane dust generated in a kiln. The higher is the level of total hydrocarbon, the higher is the level of siloxane dust. Further, a test can be conducted to measure water resistance of a gypsum product. In this test, a product is prepared and allowed to dry. The product is then submerged in water for two hours and water absorption is measured as the difference between dry and wet weights.

As shown in tables below, siloxanes with different viscosities from two different suppliers were evaluated for water resistance and total hydrocarbon released. The amount of VOC was expressed as the total hydrocarbon (THC) collected during drying at 450° F.

As shown in the tables below, the inventors have unexpectedly discovered that replacing a siloxane with low viscosity of about 20 cps with a siloxane with high viscosity of about 40 cps or higher decreases significantly the amount of total hydrocarbon released. At the same time, gypsum products prepared with a high-viscosity siloxane still retain water resistance comparable to that of conventional products prepared with a low-viscosity siloxane.

TABLE I

Evaluation Results of Siloxane from Supplier 1

| Viscosity of Siloxane, cps | 2 Hour Water Absorption, % | 40 min. THC, ppm | THC Reduction, % |
|---|---|---|---|
| 20 | 7.84 | 289262 | 0.00 |
| 40 | 9.01 | 253866 | 12.24 |
| 83 | 9.90 | 177898 | 38.50 |
| 242 | 8.87 | 177221 | 38.73 |

TABLE II

Evaluation Results of Siloxane from Supplier 2

| Viscosity of Siloxane, cps | 2 Hour Water Absorption, % | 40 min. THC, ppm | THC Reduction, % |
|---|---|---|---|
| 20 | 10.02 | 267397 | 0.00 |
| 40 | 11.25 | 245085 | 8.34 |
| 52 | 13.76 | 209090 | 21.81 |
| 78 | 10.03 | 165578 | 38.08 |

TABLE III

Evaluation Results of Siloxane from Supplier 2 (2$^{nd}$ batch)

| Viscosity of Siloxane, cps | 2 Hour Water Absorption, % | 40 min. THC, ppm | THC Reduction, % |
|---|---|---|---|
| 25 | 6.16 | 218944 | 0.00 |
| 42 | 9.22 | 147622 | 32.58 |
| 62 | 8.00 | 128235 | 41.43 |
| 75 | 9.82 | 116013 | 47.01 |

U.S. patent application 61/977,885 discloses the use of a potassium methyl siliconate coating for improving water resistance of a gypsum fiber board and decreasing the release of total hydrocarbon during production.

In some embodiments, gypsum fiber products are prepared with high viscosity siloxane and coated with a coating comprising potassium methyl siliconate. As can be seen from Table 4 below, when a coating comprising potassium methyl siliconate was used on a gypsum fiber board prepared with a high viscosity siloxane, this product was comparable in its water resistance to a coated gypsum product comprising a low-viscosity siloxane. However, a high-viscosity siloxane product emitted significantly less total hydrocarbon, suggesting a synergistic effect between a high-viscosity siloxane and a potassium methyl siliconate coating.

TABLE IV

Comparison of High Viscosity and Low Viscosity for 1% Potassium Methyl Siliconate Coated Board

| Viscosity of Siloxane, cps | 2 Hour Water Absorption, % | 40 Min. THC, ppm | THC Reduction, % |
|---|---|---|---|
| 25 | 4.34 | 223142 | — |
| 62 | 4.37 | 138410 | 37.97 |

In some embodiments, a dry wall product was prepared in which a gypsum core comprising a high-viscosity siloxane was sandwiched between two cover sheets. As shown in Table 5, wall boards prepared with a high-viscosity siloxane were comparable in their water resistance to wall boards prepared with a low-viscosity siloxane. However, wall boards made with a high-viscosity siloxane emitted significantly less total hydrocarbon. This improvement in total hydrocarbon emission was observed and determined as shown in Table 5.

TABLE V

Evaluation Results of Siloxane from Supplier 3.

| Viscosity of Siloxane, cps | 2 Hour Water Absorption, % | 75 min. THC, ppm | THC Reduction, % |
|---|---|---|---|
| 24 | 3.47 | 631821 | 0.00 |
| 36 | 2.97 | 445687 | 29.5 |

EXAMPLE 1

In this example, gypsum fiber board squares (36.8 cm×36.8 cm, with thickness of 1.27 cm) were formed from a gypsum-wood fiber slurry comprising 92.5% gypsum stucco, 7.0% wood fiber, 0.13% siloxane with various viscosity, 0.06% magnesium oxide, and 0.3% heat resistance accelerator. The slurry was poured into a Tappi mold and the water was removed by vacuum. The formed pad was pressed and laid on the table to let it set for at least 30 minutes and then dried at 110° F. overnight. Samples were prepared with siloxane with the following viscosity: 20, 25, 40, 42, 52, 62, 75, 78, 83 and 242 cps.

For a total hydrocarbon test, two samples (each 3"×5") were cut off from the board and put in a zipped plastic bag for THC measurement in the Arcadis oven at 450° F. The rest of the set board was then dried at 400° F. for 20 minutes and then at 110° F. overnight.

For a water resistance test, two samples (6"×6" each) were cut off from the dried board and then immersed in water for two hours. The amount of water absorbed in percentage of the dry weight was then calculated.

The results from the THC and water resistance tests are shown in Tables 1,2 and 3.

EXAMPLE 2

In this example, gypsum board squares (36.8 cm×36.8 cm with thickness of 1.27 cm) were formed from a gypsum-wood fiber slurry comprising 92.6% gypsum stucco, 7.0% wood fiber, 0.08% siloxane with various viscosity, 0.04% magnesium oxide, and 0.3% heat resistance accelerator. The slurry was poured into a Tappi mold and the water was removed by vacuum. The formed pad was pressed and laid on the table to let it set for at least 30 minutes. The set board was then coated with a 1% potassium methyl siliconate solution. For a low-viscosity siloxane sample, siloxane with 25 cps was used. For a high-viscosity siloxane sample, siloxane with 62 cps was used.

For a total hydrocarbon emission test, two samples (3"×5" each) were cut off from the board and put in a zipped plastic bag for THC measurement in the Arcadis oven at 450° F. The rest of the set board was then dried at 400° F. for 20 minutes and then at 110° F. overnight.

For a water resistance test, two samples (6"×6" each) were cut off from the dried board and then immersed in water for two hours. The amount of water absorbed in percentage of the dry weight was then calculated.

The results of these tests are shown in Table 4.

EXAMPLE 3

In this example dry wall samples were prepared with siloxane of various viscosities and tested for their water resistance and total hydrocarbon emission. In the following drywall example, to determine the effects of viscosity of polymethyhydrogen siloxane on THC emission, the lab boards and cubes were made as follows (% of stucco weight): siloxane 0.77%, water/stucco (FGD stucco)=1.1, MgO 0.4%, flyash 0.8%, HRA 0.05%, USG95 starch 0.3% and LC211 starch 0.3%. The dimensions of the testing boards were 4"×6"×0.5" (10.2 cm×15.2 cm×1.3 cm) with the mold tough paper on both sides (Manila paper for the face and Newslined paper for the back). Samples were prepared with siloxane with the following viscosity: 24, and 36 cps.

The Arcadis oven and THC analyzer were used to determine the THC emission and operation temperature was 450° F. and the test time 75 minutes for drying the lab board. For a water resistance test, 2"×2"×2" (5.1 cm×5.1 cm×5.1 cm) cubes were casted for water absorption determination. The results are shown in Table 5.

EXAMPLE 4

In this example, two high viscosity siloxanes from Supplier 1 at a viscosity of 48 cps and Supplier 2 at a viscosity of 58 cps were evaluated both in lab and on production line. For lab evaluation, 0.13% siloxane was used and the procedures are the same as described in Example 1. For production line evaluation, all the settings on the machine were kept the same except that high viscosity siloxane, instead of the currently used low viscosity siloxane, was pumped into the furnish line. The containers of the high viscosity siloxanes were connected to the inlet of the Siloxane metering pump through an auxiliary input. Ball valve positions were switched to select the material source from the normal run tank to the trial material. The containers of the high viscosity siloxanes were elevated to allow for gravity feed to the pump inlet. The siloxane usage on the machine was at 0.2% before, during and after the trial.

A piece of wet board sample on production line before drying was broken off from the production panel, cut into the size of 3"×5" for THC measurement in the Arcadis oven at 450° F. For a water resistance test, two samples (12"×12" each) were cut off from the dried panel and then immersed in water for two hours. The amount of water absorbed in percentage of the dry weight was then calculated.

The results from lab evaluation and production line evaluation are shown in Tables 6 and 7, respectfully.

TABLE VI

Lab Evaluation Results of Siloxanes for Machine Trial

| Viscosity of Siloxane, cps | 2 Hour Water Absorption, % | 40 min. THC, ppm | THC Reduction, % |
|---|---|---|---|
| 20 | 15.15 | 98209 | — |
| 48 | 14.95 | 58041 | 38 |
| 58 | 15.80 | 69412 | 26 |

TABLE VII

Production Line Evaluation Results of Siloxanes

| Viscosity of Siloxane, cps | 2 Hour Water Absorption, % | 40 min. THC, ppm | THC Reduction, % |
|---|---|---|---|
| 20 | 8.44 | 101827 | — |
| 48 | 8.17 | 76111 | 25.3 |
| 58 | 8.84 | 81884 | 19.6 |

As can be seen from lab evaluation and production line evaluation, a high viscosity siloxane provides water resistance to a gypsum product similar to that of a gypsum product obtained with a low viscosity siloxane. However, a high viscosity siloxane provides a significant THC reduction in comparison to a low viscosity siloxane.

What is claimed is:

1. A method of manufacturing a gypsum product, the method comprising:
   preparing a gypsum slurry comprising a high-viscosity siloxane of 30 cps to 242 cps by mixing at least stucco, water, the high-viscosity siloxane, and at least one accelerator of siloxane polymerization;
   forming the gypsum slurry into a gypsum core of a gypsum product;
   allowing the gypsum slurry to set; and
   drying the gypsum product in a kiln;
   wherein a level of siloxane dust generated in the kiln during manufacturing the gypsum product is decreased by at least 10% in comparison to a gypsum product made with a low-viscosity siloxane of about 20 cps; and wherein the gypsum product is a gypsum-fiber board and the gypsum core of the gypsum-fiber board comprises at least one surface, and the method further comprises a step of coating a water-resistant coating on the at least one surface of the gypsum core.

2. The method of claim 1, wherein the high-viscosity siloxane has viscosity from 60 cps to 80 cps.

3. The method of claim 1, wherein the level of siloxane dust during manufacturing the gypsum product is decreased by at least 30%.

4. The method of claim 1, wherein the gypsum slurry is sandwiched between two cover sheets during the step of forming.

5. The method claim 4, wherein the cover sheets are paper sheets.

6. The method of claim 1, wherein the gypsum product is selected from the group consisting of a panel, board, tile, and a ceiling tile.

7. The method of claim 1, wherein the high-viscosity siloxane is methylhydrogen siloxane.

8. The method of claim 1, wherein the accelerator of siloxane polymerization is magnesium oxide.

9. The method of claim 1, wherein the water-resistant coating comprises potassium methyl siliconate.

* * * * *